(12) United States Patent
Weiser et al.

(10) Patent No.: US 7,598,879 B2
(45) Date of Patent: Oct. 6, 2009

(54) ELECTRONIC RODENT REPELLER

(75) Inventors: Isaac Weiser, Tarzana, CA (US);
Margaret Weiser, Tarzana, CA (US);
Albert M. Williams, Sylmar, CA (US)

(73) Assignee: Exhart Environmental Systems, Inc., Chatsworth, CA (US)

( * ) Notice: Subject to any disclaimer, the term of this patent is extended or adjusted under 35 U.S.C. 154(b) by 159 days.

(21) Appl. No.: 11/824,912

(22) Filed: Jul. 3, 2007

(65) Prior Publication Data

US 2008/0156279 A1    Jul. 3, 2008

Related U.S. Application Data

(63) Continuation-in-part of application No. 11/649,385, filed on Jan. 3, 2007.

(51) Int. Cl.
*G08B 23/00* (2006.01)
(52) U.S. Cl. .................. 340/573.2; 367/139; 43/124
(58) Field of Classification Search .............. 340/573.1, 340/573.2, 384.2, 636.1; 43/124; 367/137–139
See application file for complete search history.

(56) References Cited

U.S. PATENT DOCUMENTS

| | | | |
|---|---|---|---|
| 4,215,429 A | 7/1980 | Riach | |
| D324,558 S | 3/1992 | Weiser et al. | |
| 5,205,066 A | 4/1993 | Jan | |
| 5,224,438 A | 7/1993 | Buss | |
| 5,629,605 A * | 5/1997 | Lavan et al. | 340/636.1 |
| 6,400,995 B1 | 6/2002 | Patterson et al. | |
| 2003/0201874 A1 * | 10/2003 | Wu | 340/384.2 |

* cited by examiner

*Primary Examiner*—Jeffery Hofsass
(74) *Attorney, Agent, or Firm*—Cislo & Thomas, LLP

(57) ABSTRACT

A rodent repeller having an elongated body, an end cap, an apex, a power supply, a buzzer, and a buzzer transformer. Connection of the power supply to the audible signal generator via the audible signal generator transformer produces a signal in the form of a chatter sound that mimics a frightened rodent to discourage rodents from remaining in a vicinity of the rodent repeller. The audible signal can be amplified with perforations in the apex, a tympanic resonator in the elongated body, or both. The rodent repeller can further utilize solar power.

23 Claims, 9 Drawing Sheets

ELECTRONIC RODENT REPELLER

CROSS-REFERENCE TO RELATED APPLICATIONS

This patent application is a continuation-in-part of U.S. application Ser. No. 11/649,385 filed Jan. 3, 2007, which application is incorporated here by this reference.

TECHNICAL FIELD

This invention relates to electronic devices to non-lethally repel rodents, and more specifically to devices that repel rodents by use of sound or vibration.

BACKGROUND ART

Gardeners are well aware of the damage to plants, flowerbeds, gardens, and lawns that rodents such as moles, voles, and mice can cause. Because of this damage, many people seek to keep rodents away from their gardens and lawns and to be rid of those that are already there. However, people often do not want to trap the animals because of the complexity of positioning a trap, baiting it, checking the trap, removing any caught animals, and then resetting the trap. Traps may also pose a danger to persons or non-pest animals. Furthermore, traps that kill the animal are often considered inhumane, gruesome, or otherwise inappropriate solutions to the problem.

One way to combat this problem is by way of rodent deterrent stakes. These devices are generally driven into the ground where they emit sound, ultrasonic frequencies, vibrate, or some combination of those to discourage rodents from occupying the region near the stake or array of such stakes. However, these rodent deterrent stakes often resulted in devices with unsatisfactory battery life and decreased sound output as battery power is expended. In addition, higher frequencies of some alarm and distress calls do not transmit easily or uniformly through soil or around obstructions and are, therefore, not readily detected in burrow conditions. Furthermore, the types of sounds generated are eventually ignored due to habituation and, therefore, the rodent deterrent stakes become ineffective. Therefore, there exists a need to modulate the sounds to exhibit characteristic rates and duration of documented calls of actual rodents.

Therefore, there exists a need for a non-lethal device to repel rodents from gardens, lawns, and the like that amplifies the sounds created by the device or reduces the effect of the factors that dampen the sound. There further exists a need of a device that is least likely to become ineffective due to habituation.

DISCLOSURE OF INVENTION

The rodent repeller of the present invention may have an elongated body, an end cap, an apex, a power supply, an audible signal generator, and an audible signal generator transformer. The rodent repeller may further comprise a mechanism for amplifying a sound generated by the device or reducing the effect of sound-dampening factors. For example, the apex may comprise a plurality of perforations or slits to allow the sound generated inside the device to resonate out of the device with minimal hindrance. In addition, or alternatively, an inserted end may comprise a tympanic resonator to amplify the sound generated by the audible signal generator. Also, the battery life may be extended by coupling the device to solar panels. Furthermore, habituation may be avoided by generating a chatter-sound that mimics the sounds of distressed rodents.

BEST MODE FOR CARRYING OUT THE INVENTION

The detailed description set forth below in connection with the appended drawings is intended as a description of presently-preferred embodiments of the invention and is not intended to represent the only forms in which the present invention may be constructed or utilized. The description sets forth the functions and the sequence of steps for constructing and operating the invention in connection with the illustrated embodiments. However, it is to be understood that the same or equivalent functions and sequences may be accomplished by different embodiments that are also intended to be encompassed within the spirit and scope of the invention.

Figure 1:
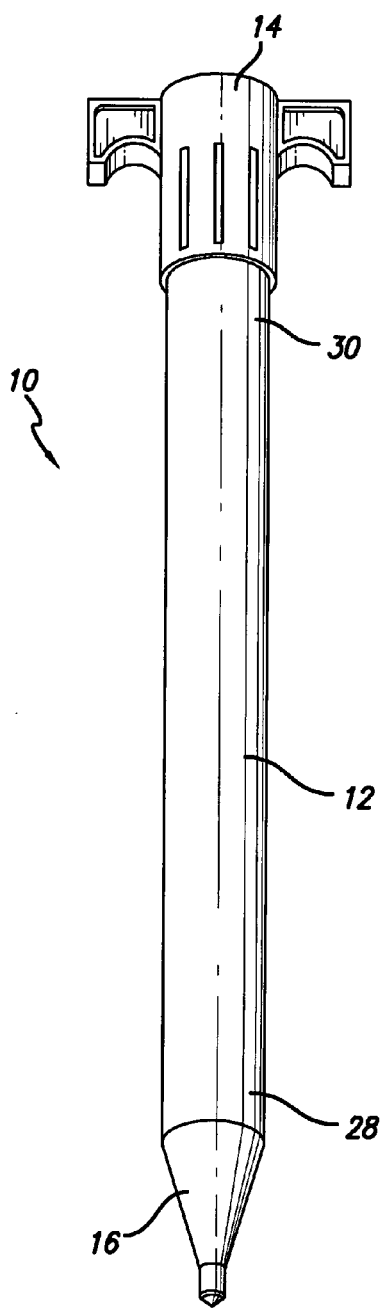
FIG. 1 is a perspective view of an embodiment of an LED signaling electronic rodent repeller.

Referring to the Figures, the present invention is directed to an electronic rodent repeller 10 for insertion into the ground. As shown if FIG. 1, the rodent repeller 10 has an elongated body 12, an end cap 14, an apex 16, a power supply 18, an audible signal generator 20, an LED 22, and an electronic controller.

The elongated body 12 has an inserted end 28, a upper end 30, and an outside diameter 32. The upper end 30 may have threads 34. The elongated body 12 is preferably a cylinder or tube, although elongated bodies having a triangular, square, or other polygonal cross-sections are also contemplated.

Figure 3:
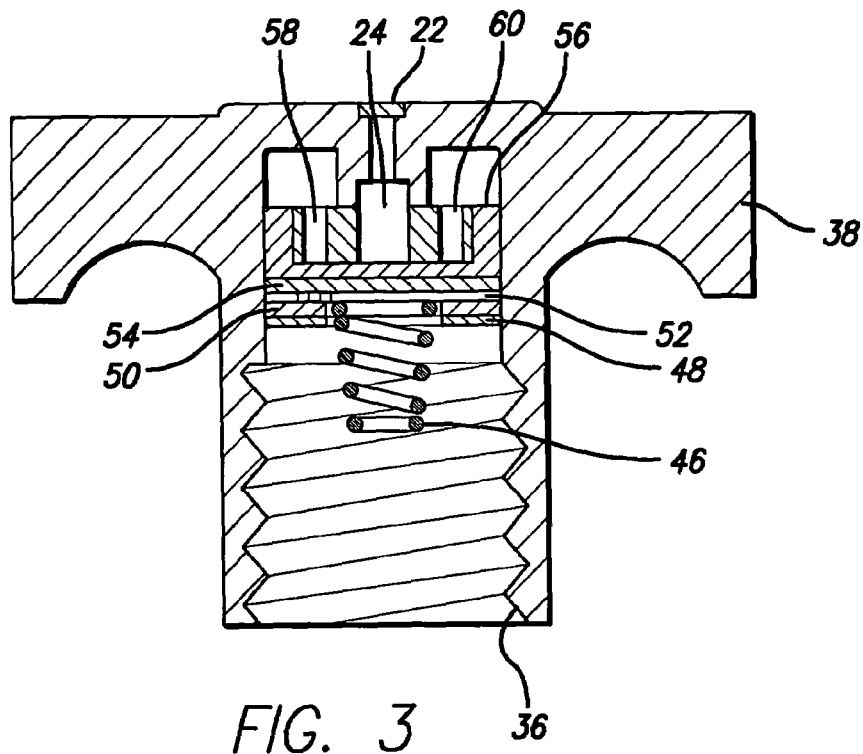
FIG. 3 is a cutaway view of the handle of an embodiment of an LED signaling electronic rodent repeller.
Figure 4:
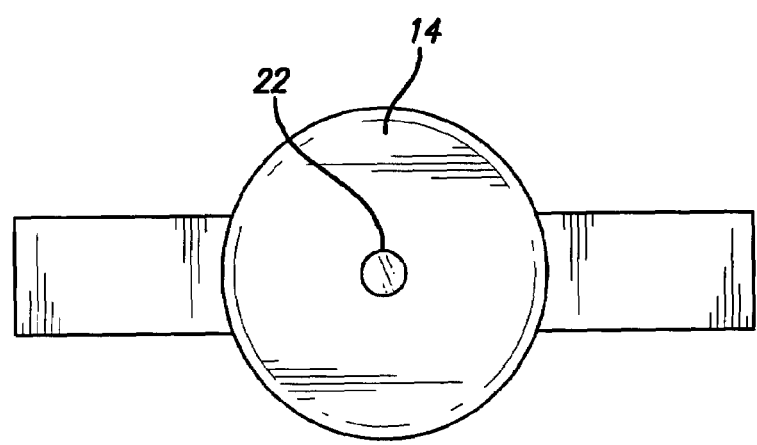
FIG. 4 is a top view of the handle of an embodiment of an LED signaling electronic rodent repeller.

As shown in FIG. 3, the end cap 14 may have threads 36 to mate with the threads 34. The end cap 14 may be threaded to the upper end 30 of the elongated body 12, although it is also contemplated that the end cap 14 be connected to the elongated body 12 by other approaches, such as gluing, welding, interference fit, and other techniques. In some embodiments, the end cap 14 may be a T-bar or T-handle, such that the end cap 14 has two protrusions 38 that emerge perpendicular to the main part of the end cap 14. The protrusions 38 facilitate installation and removal of the end cap 14 from the elongated body 12. The protrusions 38, which may be a jut, projection, or nub, also provide a handle for the user when pulling the electronic rodent repeller 10 from the ground. It is also contemplated that there may be zero, one, or more than two protrusions 38.

The apex 16 is connected to the inserted end 28 of the elongated body 12. The apex 16 may be a cone or pyramid, and it generally defines a pointed or blunted tip for the electronic rodent repeller 10. For embodiments having an elongated body 12 that is cylindrical, the apex 16 is preferably a cone, where the base diameter 40 of the cone is generally equivalent to the outside diameter 32 of the elongated body 12. An apex 16 that is conical further has a second diameter 42 that is smaller than the base diameter 40, such that the cone tapers from the base diameter 40 to the second diameter 42 to permit insertion of the rodent repeller 10 into the ground. For embodiments having an elongated body 12 that has a polygonal cross-section, the apex 16 is preferably a pyramid whose base generally matches the polygonal cross-section of the elongated body 12, such that there is a generally continuous transition between the elongated body 12 and the apex 16. For both the conical or pyramidal apex 16, the apex 16 may taper to a sharp point or to a blunt tip.

Figure 2:
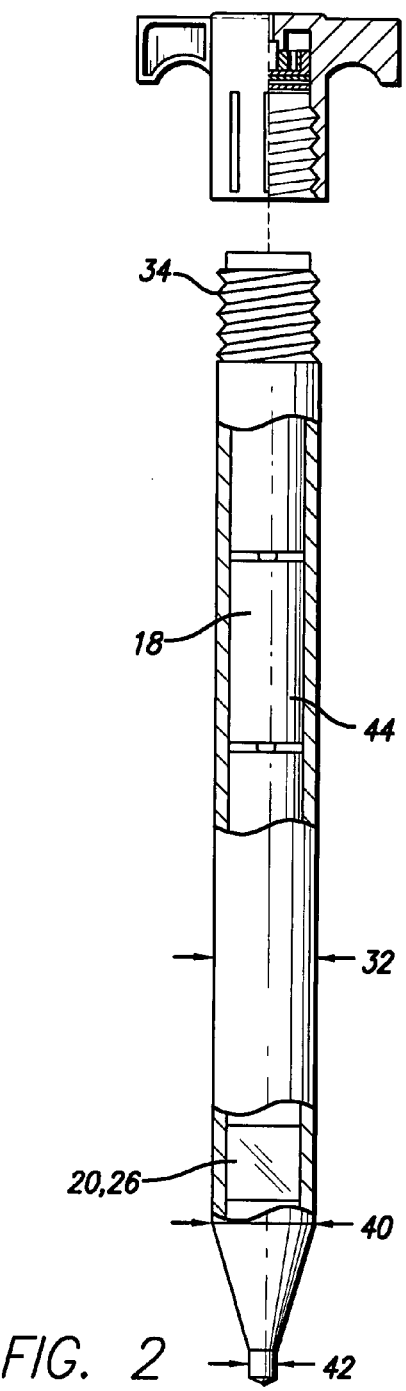
FIG. 2 is a side view of a partially exploded, partially cut away embodiment of an LED signaling electronic rodent repeller.
Figure 5A:
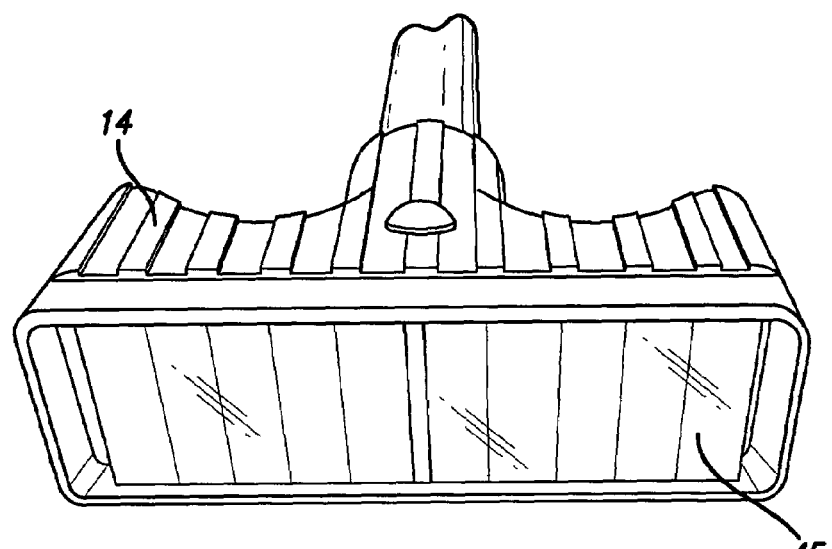
FIG. 5A is a top perspective view of a solar powered embodiment of the electronic rodent repeller.
Figure 5B:
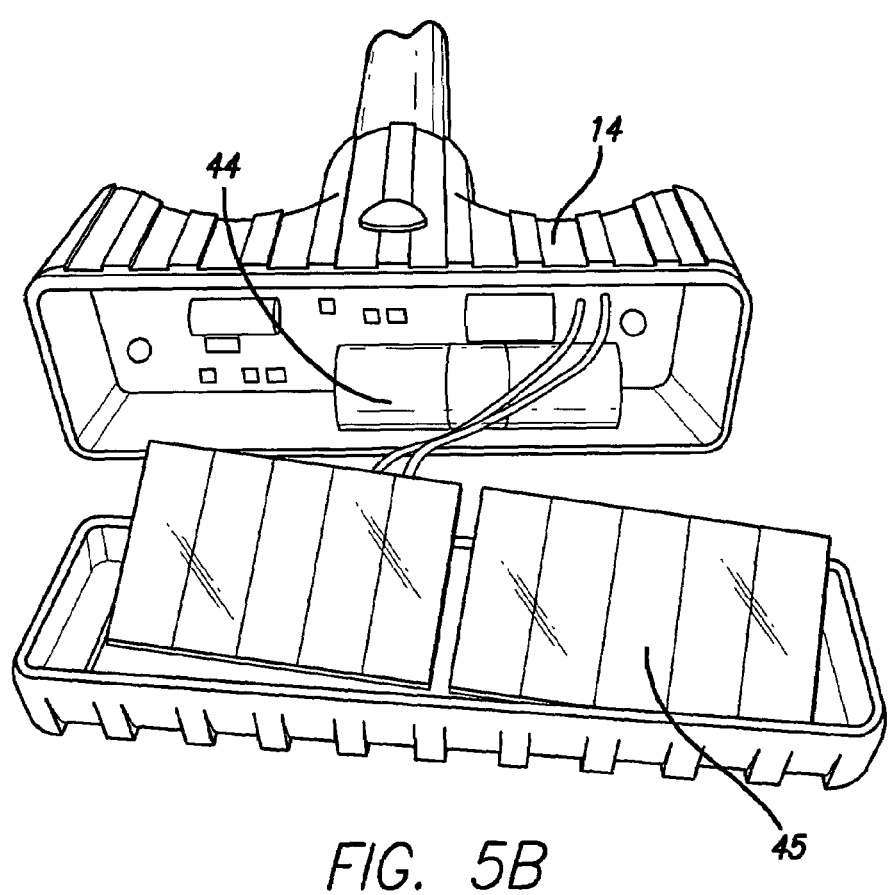
FIG. 5B is a top perspective view of a solar powered embodiment of the electronic rodent repeller with the solar panels removed.

As shown in FIG. 2, the power supply 18 may include a battery 44. In one embodiment, the power supply 18 has four "C" cell batteries. In another embodiment, the power supply 18 has three "C" cell batteries. In another embodiment, the power supply 18 may include photovoltaic cells 45, as shown in FIGS. 5A and B, to generate power from solar energy. The photovoltaic cells 45 can be the primary source of power with the battery 44 serving as a backup when solar energy is not available. In another embodiment, the battery 44 can be the primary source of power with the photovoltaic cells 45 serving as auxiliary power. In another embodiment, the battery 44 can be a rechargeable battery with the photovoltaic cells 45 providing power to recharge the battery 44. The photovoltaic cells 45 may contain a cadmium sulfide element.

The electronic controller connects the LED 22, the power supply 18, and the audible signal generator 20. The electronic controller includes an LED transformer 24, and an audible signal generator transformer 26.

The LED transformer 24 may be a Xicon® 42TL026 transformer, which is commercially available from Mouser Electronics, Inc., 1000 North Main Street, North Mansfield, Tex. 76063. Preferably, the LED transformer 24 is a Pico Electronics type 81165 transformer, which is commercially available from Pico Electronics USA, 7920 Tapia Street, Fontana, Calif. 92336. The Pico transformer is preferred, in part, because its volume is about one-third that of the Xicon® transformer. However, it is equally contemplated that other transformers may be utilized in the electronic rodent repeller 10.

The audible signal generator transformer 26 controls power to the audible signal generator 20. The audible signal generator transformer 26 may be located within the end cap 14, or it may be located immediately adjacent the audible signal generator 20. In some embodiments, the audible signal generator transformer 26 may be integral to the audible signal generator 20, for example, when the audible signal generator 20 is the purchased subassembly type KS-8406 referred to below.

The LED transformer 24 controls the amount of current received by the LED 22 to provide a visual indication of relative electric potential of the power supply 18 or the operability of the audible signal generator 20. Preferably, there is a 3:1 ratio between the brightness of the LED 22 at generally full power (e.g. fresh batteries producing about 6 volts) and the brightness of the LED 22 at minimum usable power (e.g. partially used batteries producing about 2.5 volts). The LED brightness is given by the equation $B=10\exp\{[10\exp(-4/3)][10\log_{10}(I2/I1)]\}$, where I1 is the measured illuminance at low voltage (e.g. 2.5 volts) and I2 is the measured illuminance at high voltage (e.g. 6 volts).

In embodiments of the invention having a resonant reed sounder, light may be emitted by the LED 22 as a result of polarized pulses of current that pass through the LED transformer 24 and into the LED 22 at the frequency of the resonator. This frequency is generally about ten times greater than the flutter detection frequency of the human visual system. As such, a constant, uniform intensity is generally perceived by a human observer. If the resonator is modulated at a frequency within about ten percent of the self-resonant frequency or at a frequency below about one-tenth self-resonant frequency, that modulation will generally appear as bursts of light or pulsating (integrated) light.

The LED 22 thus provides a visual signal to the user of the condition of the power supply 18. When the LED 22 is relatively bright, the supplied power is relatively high, and when the LED 22 is relatively dim, the supplied power is relatively low. When the LED brightness is between the relatively high and relatively dim levels, an intermediate amount of supplied power is indicated. When the LED 22 is not lit, the power supply is generally below a useable level such that the audible signal generator 20 may not be operating at a level sufficient to repel rodents. When the power level is relatively low, the user may want to renew the power supply by, for example, replacing any batteries. Using a light meter to test an embodiment of the invention, the inventors noted an actual illuminance of about 73 lux at a battery voltage of about 2.5 volts and an actual illuminance of about 565 lux at a battery voltage of about 6.0 volts. These values resulted in a brightness range of about 2.6:1 over the battery range from 2.5 volts to 6.0 volts. In some embodiments, an unlit LED 22 may also indicate that the audible signal generator 20 is not functioning for a reason other than a low power supply, such as a short circuit, open circuit, or other failure of the audible signal generator 20. In such embodiments, a lit LED 22 may also indicate that the audible signal generator 20 is properly functioning.

The audible signal generator 20, which may be a noisemaker, buzzer, chime, or vibrator, is generally located at the inserted end 28 of the elongated body 12. This position allows the audible signal generator 20, when the electronic rodent repeller 10 is installed in the ground, to be at an appropriate depth beneath the surface of the ground to permit the sound or vibration produced by the repeller 10 to travel through the ground. The audible signal generator 20 may be any device that produces an audible or vibratory signal perceivable by rodents. Preferably, the audible signal generator 20 is a resonant reed sounder, such as a type KS-8406 or a type KS-3603. A resonant reed sounder, also known as a Helmholtz resonator, is preferred since it helps bring about the battery longevity discussed below.

In one embodiment, the audible signal generator 20 can generate a rhythmic audible signal. In another embodiment, the audible signal can be a tone mode to produce a continuous sound. In a preferred embodiment, the audible signal can be modulated to enter a chat mode to produce a chatter sound. A chatter sound is a temporal structure of an animal voicing.

The chatter sound more closely mimics the distressed or frightened sound made by a burrowing rodent than other devices by capturing the rhythm and episode duration, characteristic of agitation and foment caused by fear and pain. As such, the chatter sound is least-likely to be ignored due to habituation, which is a common cause for these units to lose effectiveness over time. The chatter sound is also designed to transmit more deeply into the soil due to its pulsating low frequency. In addition, chatter sounds are less likely to be masked by natural sounds, such as wind and rain due to the constant on/off pattern used to generate chatter sounds.

In a preferred embodiment, the sound generated is a short sound burst or envelope followed by a dwell time or a pause. The timing of the sound would be based on a random delivery schedule of a single sound burst in a 30 second to 3 hour period constituting a time episode. Preferably the time episode is one sound burst every 30 minutes to 3 hours. It is believed that this will be most effective because it tends to renew the alert bio-reflex mechanism and delay habituation in a rodent. In addition, the extended delay of the time episode will afford reduced operating cost and/or allow higher output intensities during broadcast episodes.

The sound burst is generated by the audible signal generator, which is any sound generating device that can create a chatter sound. In a preferred embodiment, the chatter sound is created by a Helmholtz Resonator. In this process incidental harmonics and other frequencies that originate in the hammer mechanism create an inherent raspy sound consistent with rodent voicing patterns. The chattering sound may also be created by recording the actual rodent chattering sounds with a recording device and replaying the sounds at the desired intervals. The chattering sounds may also be computer generated. The chattering sounds may also be generated underground as well as above ground.

The chatter sound may include a range of voicings including chats, chatter-chatts, chips, chipping, chippering, and chucking. One of the most effective voicings is the chip characterized by an approximately 50 msec upsweep from approximately 2 KHz to approximately 14 KHz followed by a 50 msec downsweep which is then repeated after a 150 msec pause. This chatter-sound was reported to be effective in causing all chipmunks to flee the area. The time envelope rate was about 4 chips/sec.

Figure 8:
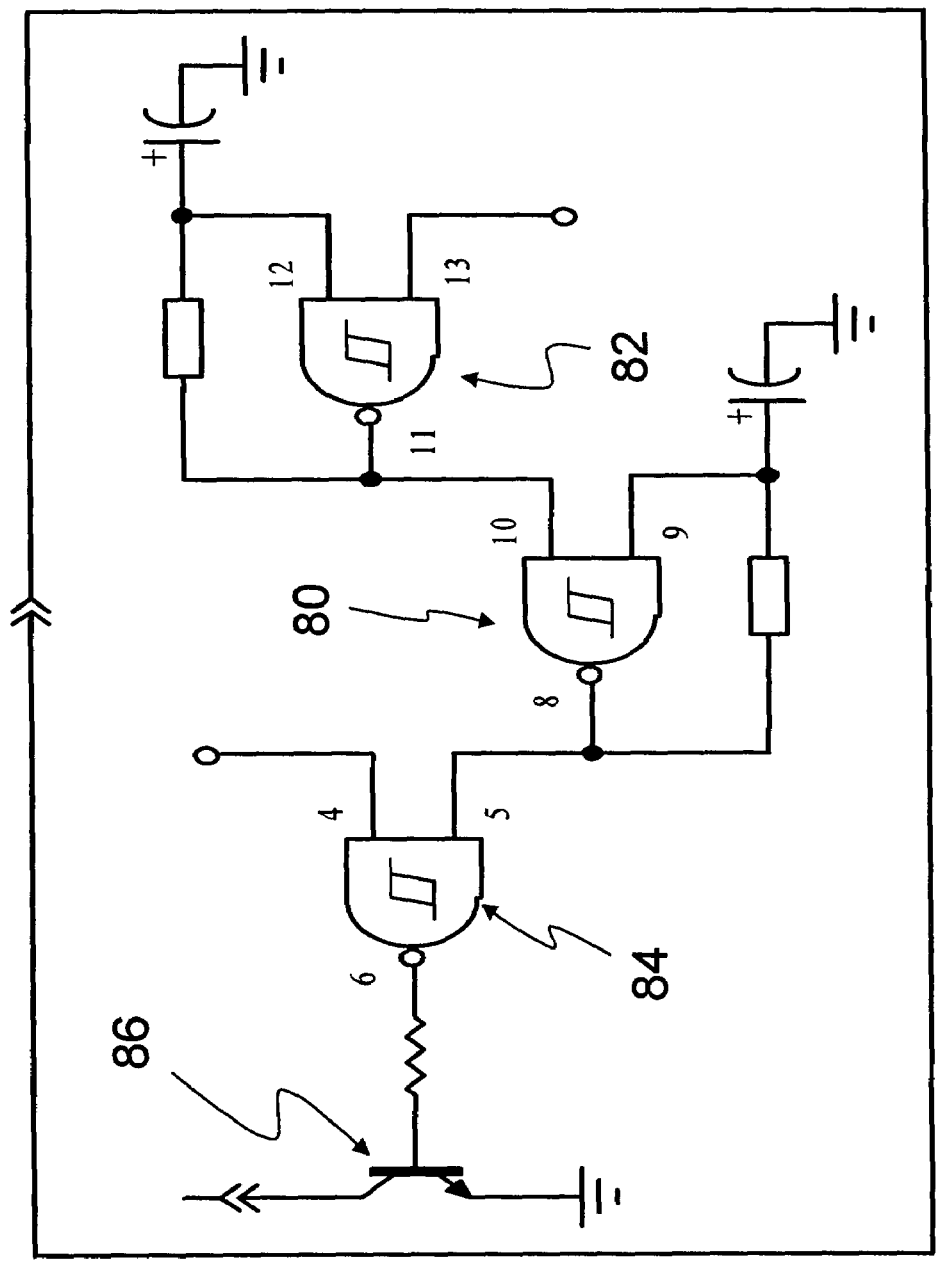
FIG. 8 is a logic diagram for generating the chatter sound.

FIG. 8 shows a logic diagram of the generation of the chatter sound. This logic is arranged for NPN driver circuits such as found in the KS-8406 3-terminal sounder device. These circuits typically have 6-volt operating systems and the preferred IC is N74HC132. One-volt products generally use KS-3603 2-terminal sounders with external PNP drivers and an IC type 74LV132D.

A first NAND gate and passive components attached thereto constitute an oscillator 80 of variable duty-cycle to produce the chatter sound. This chat-sound origination is gated by the output from a second NAND gate and passive components connected thereunto constituting an episode timer 82. The episode timer 82 controls both active and inactive periods. A third NAND gate section is designated as a driver 84, which passes control information to the Helmholtz Resonator NPN switching transistor 86. An episode thus controlled is characterized by pulses of variable duration within a variable active period. Distinctive sound properties are a function of pulse repetition rates set within a narrow frequency range creating a sound burst of approximately 20 msec to approximately 200 msec in duration and a frequency of about 1 Hz to about 20 Hz. Preferably the sound burst is approximately 50 msec to approximately 100 msec with a frequency of about 4 Hz to about 11 Hz. More preferably, the sound burst is about 7.4 Hz. The sound pressure level (SPL) measured at the apex 16 is approximately 50 decibels (dB) to approximately 150 dB. Preferably, the SPL is approximately 85 to approximately 120 dB. More preferably, the SPL is 105 dB at the apex 16.

Figure 9:
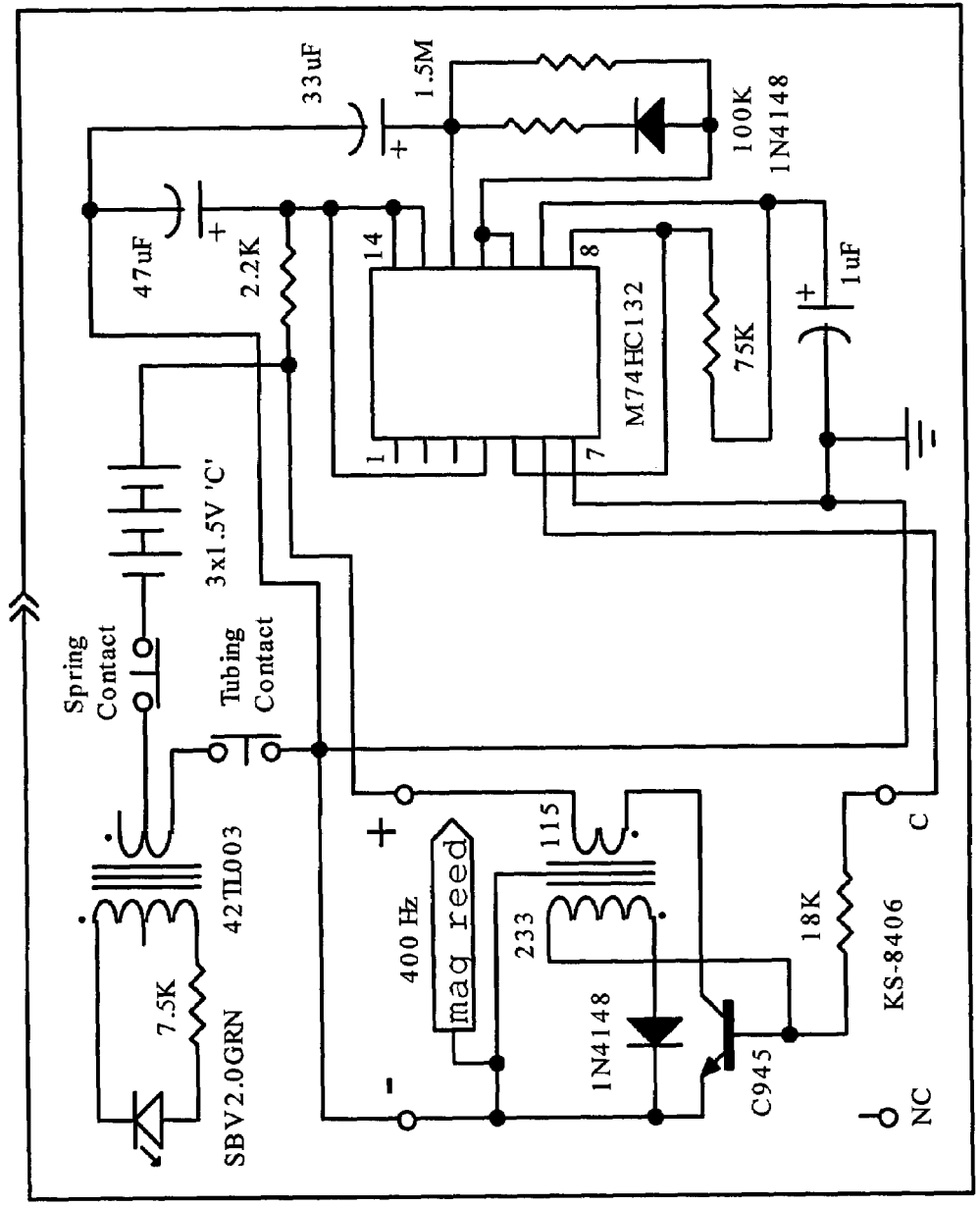
FIG. 9 is an example of a circuit diagram implementing the concepts of the logic diagram in FIG. 8.

FIG. 9 is an example of a circuit diagram to implement the concepts of the block diagram shown in FIG. 8. The embodiment of the rodent repeller implementing this circuit diagram utilizes three "C" batteries (7100 mAh alkaline), has a lower cost timing IC, keeps KS-8406 buzzer and use without driver transistor, adds the chatter sound, and continues to utilize the LED indicator.

Figure 10:
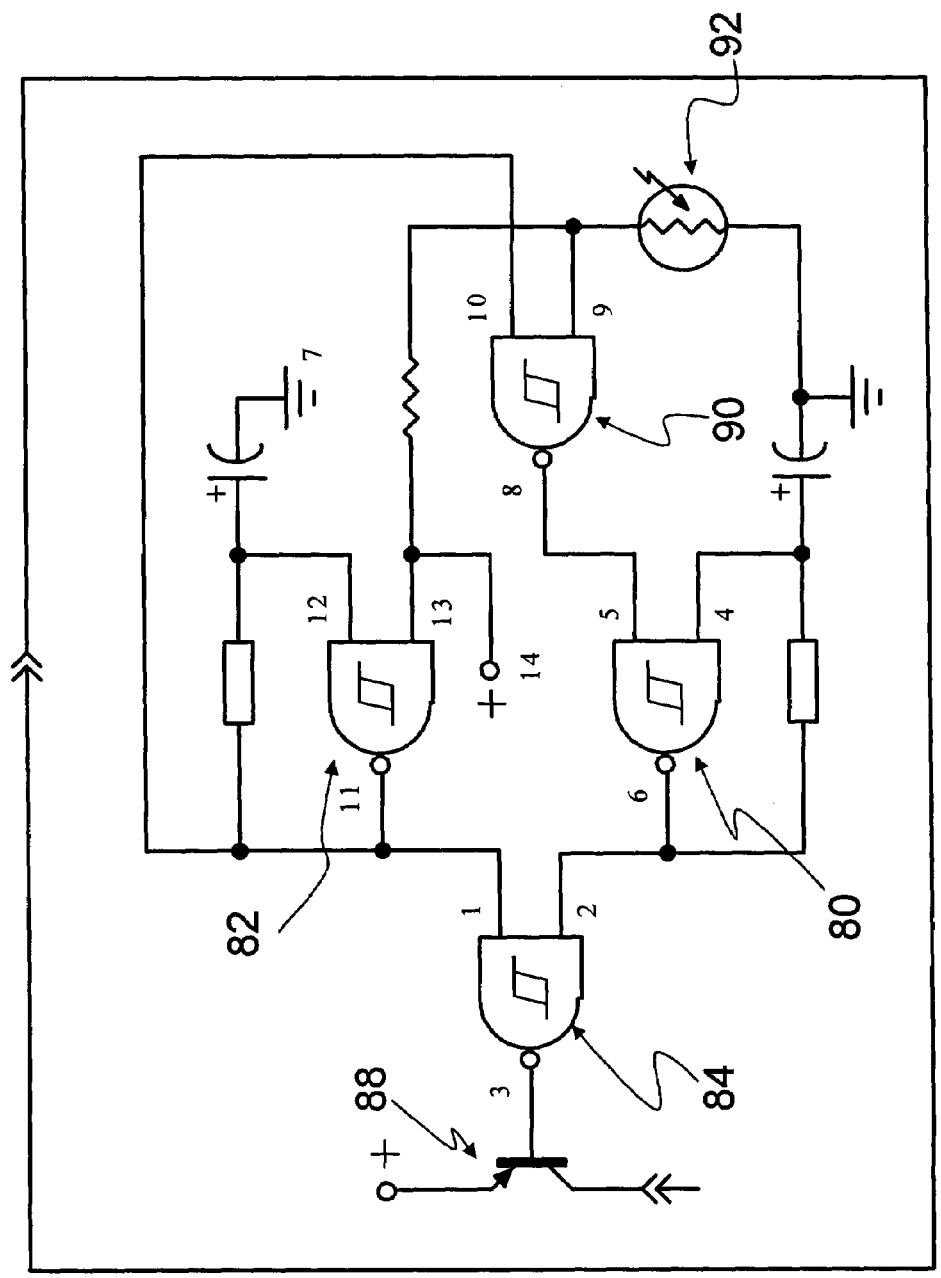
FIG. 10 is a logic diagram for generating the chatter sound for an embodiment using solar power.

FIG. 10 shows a logic diagram of an embodiment of this invention using solar power. The solar powered rodent repeller also comprises a first NAND gate and passive components attached thereto constituting an oscillator 80 of variable duty-cycle to produce the chatter sound; a second NAND gate and passive components connected thereunto constituting an episode timer 82 to control both active and inactive periods; and a third NAND gate section designated as a driver 84; however, oscillator 80, timer 82, and driver 84 are coupled as shown in FIG. 9 to compensate for the drive phase for a PNP transistor 88. In addition, the solar powered rodent repeller comprises a fourth NAND gate constituting a solar gate 90 to perform solar status control. The sun is detected by a solar resistor 92. The solar resistor 92 may be a cadmium sulfide element. When the episode timer 82 is low the PNP transistor 88 is off. When the episode timer 82 is high the PNP transistor state depends on the solar input. When the sun is detected by a photo-resistor 92 the solar gate 90 goes to a low logic state where it will remain as long as solar intensity is above 0.25 w/m$^2$ (watts/square-meter) (about 30 Lux CIE). In sunny places, for example Southern California, solar power density exceeds 0.25 w/m$^2$ from approximately 6 AM to approximately 6 PM on a clear summer day. In severe overcast and after sunset, the solar gate 90 will be set high to recall the tone mode during active time periods.

When the sun is detected the oscillator 80 is activated and its output will turn the PNP transistor 88 on and off at a pre-set rate of about 7 Hz as long as the episode timer 82 is in a high state. When the sun goes down or during severe overcast the PNP transistor 88 will react only to the episode timer 82 input and enter a tone mode, which is distinguishable from the chat mode. The tone mode provides a normal repetitive on and off sequence comprised of a short tone burst followed by a long dwell period. In one embodiment, the sound is a monotonic 400 Hz, unmodulated sound output lasting from approximately 1.5 seconds to approximately 2 seconds followed by a silent interval from approximately 30 seconds to approximately 45 seconds. The chat mode is reactivated at dawn. This particular operational mode is considered to be most disturbing to burrowing rodents because of their nocturnal nature, foraging at night and sleeping during the day.

Figure 11:
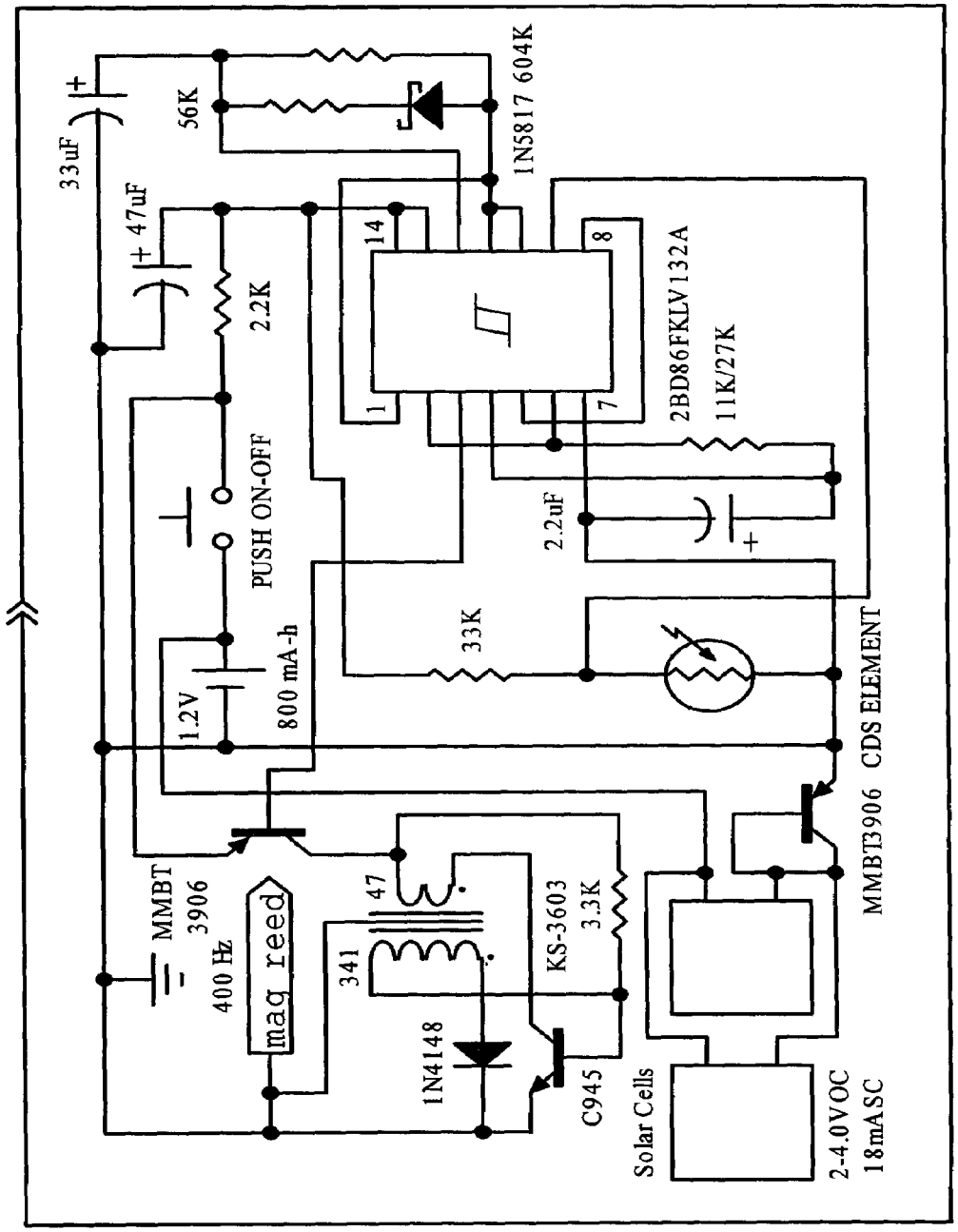
FIG. 11 is a circuit diagram implementing the concepts of the logic diagram in FIG. 10.

FIG. 11 is a circuit diagram implementing the concepts of the block diagram shown in FIG. 10. In another embodiment, chat-sound may be modulated during tone-mode to provide for various chat-sound episodes.

Figure 6A:
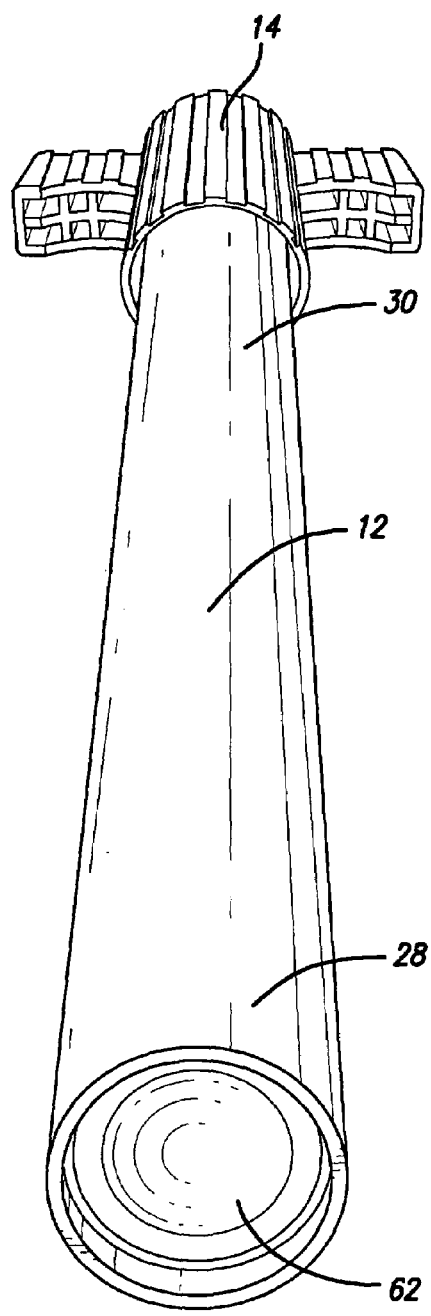
FIG. 6A is a bottom perspective view of a rodent repeller with the apex removed.

In another embodiment, the audible signal can be amplified with a tympanic resonator 62, as shown in FIG. 6A. The tympanic resonator can be located at any location along the elongated body 12. The placement of the tympanic resonator 62 can also be used to tune the pitch of the sound generated. For example, the audible signal generator 20 can be located at the upper end 30. This will cause a vibrating air column down the elongated body 12. By placing the tympanic resonator 62 near the audible signal generator 20 the vibrating air column is shortened, thereby creating a higher pitch. Placing the tympanic resonator 62 further away from the audible signal generator lengthens the vibrating air column, thereby lowering the pitch. In one embodiment the tympanic resonator 62 is located at the inserted end 28 between the inserted end 28 and the apex 16.

The tympanic resonator 62 can be made of any material that is stiff, elastic and conducive to amplifying sound. For example, the tympanic resonator 62 can be made of plastic, such as polypropylene, metals, such as aluminum, and composite materials, such as fiber-reinforced materials, and thermoplastic polymer resin such as polyethylene terephthalate sold under the trademark Mylar®. The tympanic resonator 62 may be approximately 0.05 mm thick to approximately 1 mm thick. Preferably, the tympanic resonator 62 is approximately 0.1 mm thick to approximately 0.33 mm thick.

The tympanic resonator 62 is attached to the elongated body with any type of fastening device. Preferably, the tympanic resonator 62 is sealed to the tympanic resonator with a water-resistant adhesive. Using a water-resistant adhesive prevents water from entering into the elongated tube and protects the electrical wiring of the rodent repeller 10.

In another embodiment, the audible signal can be amplified by including at least one opening 64 at the apex 16. An opening 64 at the apex, minimizes the impedance or dampening to the sound propagation caused by the walls of the apex 16. Preferably, the apex comprises a plurality of openings 64. In one embodiment, the apex 16 comprises openings on the side. However, the opening can be located anywhere on the apex.

Figure 6B:
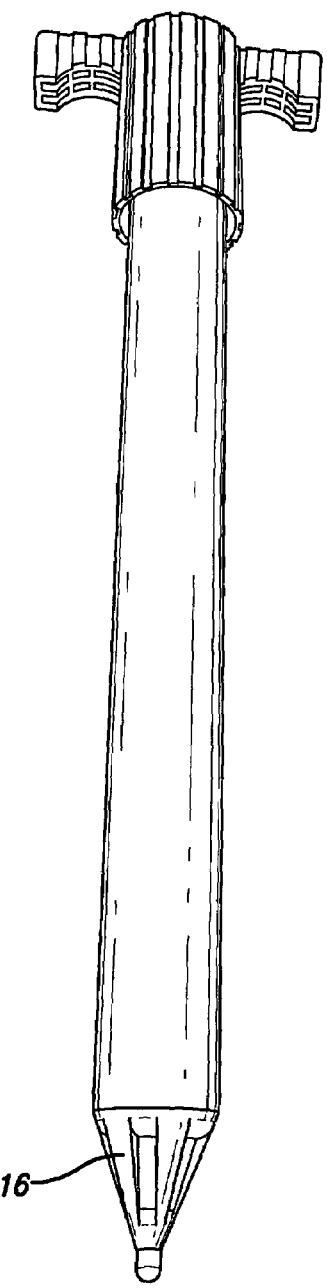
FIG. 6B is a perspective view of another embodiment of the rodent repeller.
Figure 7A:
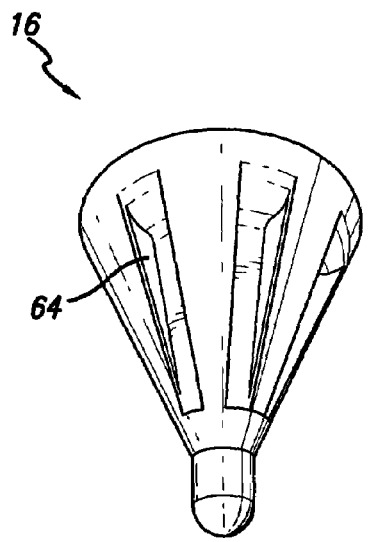
FIG. 7A is a perspective view of the apex depicted in FIG. 6B.
Figure 7B:
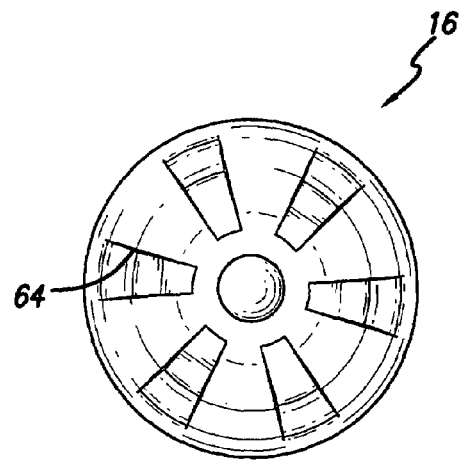
FIG. 7B is a bottom view of the apex in FIG. 7A.
Figure 7C:
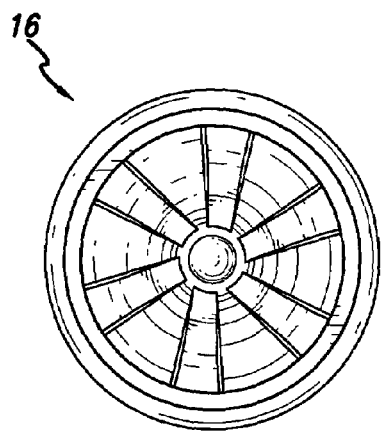
FIG. 7C is a top view of the apex in FIG. 7A.
Figure 7D:
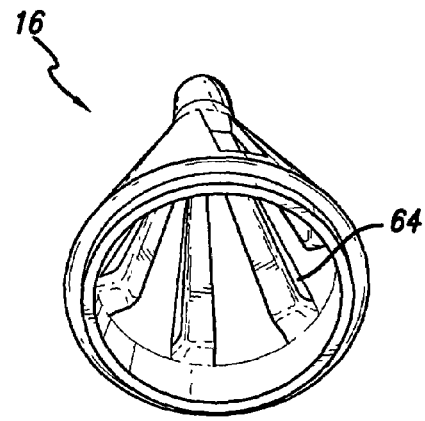
FIG. 7D is a perspective view of the apex in FIG. 7A.

The openings 64 can be in any shape. In one embodiment, the openings 64 are a plurality of longitudinal slits along the circumference of the side of the apex 16, as shown in FIG. 6B. The openings 64 may be horizontal, oblique or any combination thereof. In a preferred embodiment, the slits are created by creating a plurality of indented walls into the surface of the apex or radially shifting portions of the apex inward as shown in FIGS. 7A-D. Providing indented walls with slits along the sides helps reduce excess dirt from entering into the apex.

The LED 22 may be a standard light emitting diode and it may be a super bright LED. The LED 22 is preferably a 3 mm green LED, such as a model number RL32-G4518. However, the LED 22 may emit light of various colors such as white, green, red, blue, amber, and others. It is also contemplated that other small light bulbs or other light sources may be used with the device.

The LED transformer 24 and LED 22 are preferably located within the end cap 14. This placement allows for ease of access, maintenance, or retrofit of similar units where desired. The end cap 14 may further contain a battery spring 46, a contact ring 48, a fiber insulator 50, a spring plate 52, and a neoprene washer 54. A ground circuit pin 58 is connected to the contact ring 48, and a negative battery pin 60 is connected to the battery spring 46 via the spring plate 52. The connections may be by welding, soldering, or otherwise attaching the pin to its respective connecting structure. Along with a fastener, such as a screw, through the spring plate 52 and extending into the end cap 14, there may be push-on clips on the ground circuit pin 58 and the negative battery pin 60 to further secure the assembly to the end cap 14.

In the depicted embodiment, the battery spring 46 extends through a space in the center of the contact ring 48 to connect to the spring plate 52. The contact ring 48 and the spring plate 52 are separated by the fiber insulator 50. The neoprene washer 54 separates the spring plate 52 from the plug 56. The plug 56 may be an acrylonitrile-butadiene-styrene (ABS) insulator. The spring plate 52, contact ring 48, fiber insulator 50, and neoprene washer 54 may be permanently bonded together for ease of installation or retrofit of similar rodent repeller devices.

In the preferred embodiment, the rodent repeller 10 is activated by twisting the end cap 14 about the elongated body 12 in a direction corresponding to tightening the end cap 14 onto the elongated body 12. When the end cap 14 is twisted such that the contact ring 48 contacts the elongated body 12 and the battery spring 46 contacts the negative terminal of the power supply 18, an electric circuit is completed between the power supply 18, the audible signal generator 20, and the LED 22. Activation by other techniques, such as by push button, toggle switch, or sliding the end cap, are also contemplated. Once activated, some versions may be sealed against the weather or to prevent tampering. The connection of the power supply 18 to the audible signal generator 20 produces an audible or vibratory signal to discourage rodents from remaining in the vicinity of the rodent repeller 10. Furthermore, connection of the power supply to the LED 22 produces a visual indicator that the rodent repeller 10 is operable.

Along with ease of use and providing a visual indication that the device is operating, another advantage of the invention is increased battery life. By reducing the drive current to the audible signal generator or resonant reed sounder, the inventors were able to improve battery longevity by about 8%, while only having about a ½ dB reduction in sound pressure level. For example, the standard buzzer input power is about 25 mW at about 4.25 volts DC. A reduction in buzzer input power to about 21.1 mW at 4.25 volts DC (from a reduction in current of about 8.8%) produced a reduction in loudness of about 0.6 dB. Since a change in sound pressure level of less than 1 dB is generally considered to be below the human perception threshold, a 0.6 dB reduction is inaudible.

While the present invention has been described in regard to particular embodiments, it is recognized that additional variations of the present invention may be devised without departing from the inventive concept. For example, the audible signal can be a sound imitating the frightened sounds of any other type of animal that the user wishes to repel. Alternatively, the audible signal can be the sounds made by a predator of the type of animal the user desires to repel.

INDUSTRIAL APPLICABILITY

This invention may be industrially applied to electronic devices that non-lethally repel rodents by use of sound and vibration.

What is claimed:

1. A rodent repeller for insertion into the ground, comprising:
   (a) an elongated body having an inserted end, an upper end, and an outside diameter, the upper end having threads, the elongated body being a cylinder, the inserted end comprising a tympanic resonator;
   (b) an end cap threaded to the upper end of the elongated body, the end cap comprising a T-handle, the T-handle having two protrusions that emerge perpendicular to a main part of the end cap;
   (c) an apex at the inserted end of the elongated body, the apex being a cone having a base diameter generally equivalent to the outside diameter of the elongated body, the apex having a second diameter that is smaller than the base diameter such that the apex tapers from the base diameter to the second diameter, the apex having a plurality of perforations;
   (d) a power supply, the power supply comprising a battery and a photovoltaic cell;

(e) an audible signal generator, the audible signal generator being a resonant reed sounder, wherein the sound produced is a chattering sound that mimics the sound of distressed or frightened rodents;
(f) an audible signal generator transformer to control power to the audible signal generator;
(g) an LED, the LED having a brightness; and
(h) an LED transformer, the LED transformer controlling an amount of power to the LED such that there is a generally 3:1 ratio between the brightness of the LED at an amount of power of about 6 volts and the brightness of the LED at an amount of power of about 2.5 volts;
(i) wherein connection of the power supply to the audible signal generator, via the audible signal generator transformer, produces an audible signal to discourage rodents from remaining in a vicinity of the rodent repeller; and wherein connection of the power supply to the LED, via the LED transformer, produces a relative visual indicator, by brightness, that the rodent repeller is operable.

2. An electronic rodent repeller, comprising:
(a) an elongated body having an inserted end, an upper end, and an outside perimeter;
(b) an end cap connected to the upper end of the elongated body;
(c) an apex at the inserted end of the elongated body;
(d) a power supply located within the elongated body;
(e) an audible signal generator located within the elongated body;
(f) an audible signal generator transformer controlling power to the audible signal generator;
wherein connection of the power supply to the audible signal generator, via the audible signal generator transformer, produces an audible signal in the form of a chattering sound that mimics a distressed rodent to discourage the rodent from remaining in a vicinity of the rodent repeller; and
wherein the apex comprises a perforation to reduce the muffling of the audible signal by the apex.

3. The electronic rodent repeller of claim 2 wherein the inserted end of the elongated body comprises a tympanic resonator to amplify the audible signal.

4. The electronic rodent repeller of claim 3 further comprising
(a) an LED connected to the end cap;
(b) an LED transformer, the LED transformer controlling an amount of power to the LED; and
(c) wherein connection of the power supply to the LED, via the LED transformer, produces a visual indicator that the rodent repeller is operable.

5. The electronic rodent repeller of claim 4 wherein the power supply comprises photovoltaic cells to generate power from solar energy.

6. The electronic rodent repeller of claim 5, the LED having a high brightness and a low brightness, the low brightness being more dim than the high brightness, the LED transformer receiving a voltage from the power supply, the voltage varying in amount from a high voltage to a low voltage, the LED transformer controlling the amount of power to the LED such that the LED has a high brightness when the high voltage is received by the LED transformer and the LED has a low brightness when the low voltage is received by the LED transformer.

7. The electronic rodent repeller of claim 6, the LED further having an intermediate brightness being more dim than the high brightness and less dim than the low brightness, the LED transformer further receiving an intermediate voltage from the power supply, the intermediate voltage being between the high voltage and the low voltage, the LED transformer controlling the amount of power to the LED such that the LED has an intermediate brightness when the intermediate voltage is received by the LED transformer.

8. An electronic rodent repeller, comprising:
(a) an elongated body having an inserted end, an upper end, and an outside perimeter;
(b) an end cap connected to the upper end of the elongated body;
(c) an apex at the inserted end of the elongated body;
(d) a power supply located within the elongated body;
(e) an audible signal generator located within the elongated body;
(f) an audible signal generator transformer controlling power to the audible signal generator;
wherein connection of the power supply to the audible signal generator, via the audible signal generator transformer, produces an audible signal in the form of a chattering sound that mimics a distressed rodent to discourage the rodent from remaining in a vicinity of the rodent repeller;
wherein the inserted end of the elongated body comprises a tympanic resonator to amplify the audible signal.

9. The electronic rodent repeller of claim 8 further comprising
(a) an LED connected to the end cap;
(b) an LED transformer, the LED transformer controlling an amount of power to the LED; and
(c) wherein connection of the power supply to the LED, via the LED transformer, produces a visual indicator that the rodent repeller is operable.

10. The electronic rodent repeller of claim 9 wherein the power supply comprises photovoltaic cells to generate power from solar energy.

11. An electronic rodent repeller, comprising:
(a) an elongated body having an inserted end, an upper end, and an outside perimeter;
(b) an end cap connected to the upper end of the elongated body;
(c) an apex at the inserted end of the elongated body;
(d) a power supply located within the elongated body;
(e) an audible signal generator located within the elongated body;
(f) an audible signal generator transformer controlling power to the audible signal generator;
(g) an LED connected to the end cap; and
(h) an LED transformer, the LED transformer controlling an amount of power to the LED;
wherein connection of the power supply to the audible signal generator, via the audible signal generator transformer, produces an audible signal in the form of a chattering sound that mimics a distressed rodent to discourage the rodent from remaining in a vicinity of the rodent repeller;
wherein connection of the power supply to the LED, via the LED transformer, produces a visual indicator that the rodent repeller is operable;
wherein the apex comprises a perforation to provide an unobstructive path to propagate the audible signal through the apex.

12. The electronic rodent repeller of claim 11 wherein the power supply comprises photovoltaic cells to generate power from solar energy.

13. An electronic rodent repeller, comprising:
(a) an elongated body having an inserted end, an upper end, and an outside perimeter;

(b) an end cap connected to the upper end of the elongated body;
(c) an apex at the inserted end of the elongated body, wherein the apex comprises a perforation;
(d) a power supply located within the elongated body;
(e) an audible signal generator located within the elongated body;
(f) an audible signal generator transformer controlling power to the audible signal generator;
(g) wherein connection of the power supply to the audible signal generator, via the audible signal generator transformer, produces an audible signal to discourage rodents from remaining in a vicinity of the rodent repeller.

14. The electronic rodent repeller of claim 13 wherein the inserted end of the elongated body comprises a tympanic resonator to amplify the audible signal.

15. The electronic rodent repeller of claim 14 further comprising
(a) an LED connected to the end cap;
(b) an LED transformer, the LED transformer controlling an amount of power to the LED; and
(c) wherein connection of the power supply to the LED, via the LED transformer, produces a visual indicator that the rodent repeller is operable.

16. The electronic rodent repeller of claim 15 wherein the power supply comprises photovoltaic cells to generate power from solar energy.

17. The electronic rodent repeller of claim 13 further comprising
(a) an LED connected to the end cap;
(b) an LED transformer, the LED transformer controlling an amount of power to the LED; and
(c) wherein connection of the power supply to the LED, via the LED transformer, produces a visual indicator that the rodent repeller is operable.

18. The electronic rodent repeller of claim 17 wherein the power supply comprises photovoltaic cells to generate power from solar energy.

19. The electronic rodent repeller of claim 13 wherein the power supply comprises photovoltaic cells to generate power from solar energy.

20. An electronic rodent repeller, comprising:
(a) an elongated body having an inserted end, an upper end, and an outside perimeter, wherein the inserted end comprises a tympanic resonator to amplify the audible signal;
(b) an end cap connected to the upper end of the elongated body;
(c) an apex at the inserted end of the elongated body;
(d) a power supply located within the elongated body;
(e) an audible signal generator located within the elongated body;
(f) an audible signal generator transformer controlling power to the audible signal generator;
(g) wherein connection of the power supply to the audible signal generator, via the audible signal generator transformer, produces an audible signal to discourage rodents from remaining in a vicinity of the rodent repeller.

21. The electronic rodent repeller of claim 20 further comprising
(a) an LED connected to the end cap;
(b) an LED transformer, the LED transformer controlling an amount of power to the LED; and
(c) wherein connection of the power supply to the LED, via the LED transformer, produces a visual indicator that the rodent repeller is operable.

22. The electronic rodent repeller of claim 21 wherein the power supply comprises photovoltaic cells to generate power from solar energy.

23. The electronic rodent repeller of claim 20 wherein the power supply comprises photovoltaic cells to generate power from solar energy.

* * * * *